(12) United States Patent
Monleón de la Lluvia Jordá et al.

(10) Patent No.: US 10,710,751 B2
(45) Date of Patent: Jul. 14, 2020

(54) RIGGING TOOL FOR A CONTROL SURFACE OF AN AIRCRAFT

(71) Applicant: Airbus Operations, S.L., Madrid (ES)

(72) Inventors: Alejandro Monleón de la Lluvia Jordá, Getafe (ES); Alejandro Rosique Gómez, Getafe (ES)

(73) Assignee: Airbus Operations, S.L., Getafe (Madrid) (ES)

( * ) Notice: Subject to any disclaimer, the term of this patent is extended or adjusted under 35 U.S.C. 154(b) by 224 days.

(21) Appl. No.: 15/897,970

(22) Filed: Feb. 15, 2018

(65) Prior Publication Data

US 2018/0251236 A1    Sep. 6, 2018

(30) Foreign Application Priority Data

Feb. 17, 2017 (EP) .................................... 17382080

(51) Int. Cl.
  *B64F 5/60* (2017.01)
  *G01B 11/27* (2006.01)
  *G01C 15/00* (2006.01)

(52) U.S. Cl.
  CPC ............... *B64F 5/60* (2017.01); *G01B 11/27* (2013.01); *G01C 15/004* (2013.01); *G01C 15/002* (2013.01)

(58) Field of Classification Search
  CPC ......... B64F 5/60; G01B 11/27; G01B 15/004; G01C 15/004
  USPC .......................................................... 33/286
  See application file for complete search history.

(56) References Cited

U.S. PATENT DOCUMENTS

| | | | | |
|---|---|---|---|---|
| 3,612,949 A | * | 10/1971 | Becraft | G01C 5/00 356/153 |
| 3,631,601 A | * | 1/1972 | McNulty | F16M 11/125 33/228 |
| 3,635,108 A | * | 1/1972 | Prince | B23B 41/02 33/286 |
| 3,723,013 A | * | 3/1973 | Stirland | G01B 11/26 356/152.1 |
| 4,681,439 A | * | 7/1987 | Shoemaker | G01C 15/002 33/286 |
| 4,730,928 A | | 3/1988 | Gabriel et al. | |
| 5,402,226 A | * | 3/1995 | Matthews | G01B 11/26 33/285 |

(Continued)

OTHER PUBLICATIONS

Extended European Search Report for European Application No. 17382080 dated Jun. 26, 2017.

(Continued)

*Primary Examiner* — Christopher W Fulton
(74) *Attorney, Agent, or Firm* — Jenkins, Wilson, Taylor & Hunt, P.A.

(57) ABSTRACT

A rigging tool for a control surface of an aircraft, including a laser for outputting a low energy laser beam, a target assembly including a plate including a target point, and a support to sustain the target assembly on a surface of a control surface, and a laser platform provided with structure to rest on a surface of a control surface, having backward and forward extremes, the backward extreme being configured to hold the laser, and the forward extreme including a pair of holes at opposite positions aligned with the output of the laser, such that, in operation, when the laser beam passes through the holes and incises in the target point, a neutral position of a control surface is indicated.

9 Claims, 6 Drawing Sheets

(56) References Cited

U.S. PATENT DOCUMENTS

| | | | | |
|---|---|---|---|---|
| 5,438,404 A * | 8/1995 | Hamilton | | F41G 3/323 |
| | | | | 356/141.1 |
| 5,467,193 A * | 11/1995 | Laewen | | G01B 11/00 |
| | | | | 250/491.1 |
| 5,956,150 A * | 9/1999 | Kanne | | G01B 11/27 |
| | | | | 250/227.24 |
| 6,124,935 A * | 9/2000 | Matthews | | G01C 15/008 |
| | | | | 33/286 |
| 6,286,219 B1 * | 9/2001 | Palumbo, II | | G01C 15/002 |
| | | | | 33/227 |
| 6,510,615 B1 * | 1/2003 | Budd | | G01B 11/26 |
| | | | | 33/286 |
| 6,628,378 B1 * | 9/2003 | Marangoni | | G01B 11/27 |
| | | | | 33/286 |
| 7,562,809 B2 * | 7/2009 | Chua | | H05K 1/0269 |
| | | | | 235/375 |
| 8,209,874 B1 * | 7/2012 | Tribble | | G01C 15/06 |
| | | | | 33/227 |
| 8,706,428 B1 * | 4/2014 | Righi | | G01B 11/16 |
| | | | | 702/34 |
| 2002/0038513 A1 * | 4/2002 | Kallesen | | G01C 15/008 |
| | | | | 33/286 |
| 2004/0117995 A1 | 6/2004 | Reed et al. | | |
| 2005/0223572 A1 * | 10/2005 | Davis | | B25H 7/005 |
| | | | | 33/286 |
| 2014/0007397 A1 | 1/2014 | Stahl et al. | | |
| 2014/0115907 A1 * | 5/2014 | Gamon | | G01C 15/004 |
| | | | | 33/286 |

OTHER PUBLICATIONS

European Office Action for Application No. 17382080.4 dated May 15, 2019.

* cited by examiner

RIGGING TOOL FOR A CONTROL SURFACE OF AN AIRCRAFT

CROSS-REFERENCE TO RELATED APPLICATION

This application claims the benefit of and priority to European patent application No. 17382080.4, filed on Feb. 17, 2017, the entire disclosure of which is incorporated by reference herein.

TECHNICAL FIELD

The present disclosure refers to a rigging tool for setting a neutral position on a control surface of an aircraft, such as an elevator, a rudder, a flap, or an aileron.

BACKGROUND

Actually there are more than six tools to perform neutral position setting tasks of trimmable horizontal stabilizer elevators of an entire fleet. These tools have different purposes, sizes, and accuracies.

Figure 1:
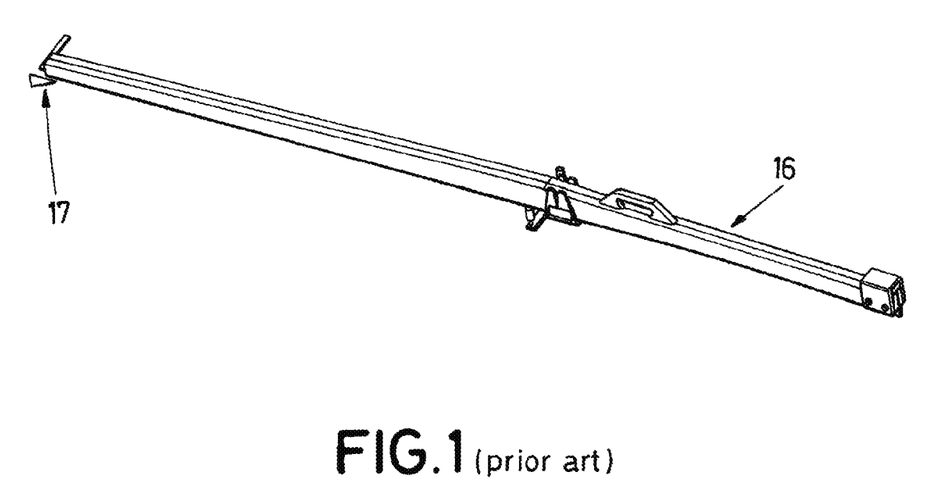
FIG. 1 shows a mechanical rigging tool of the state of the art.

FIG. 1 shows a rigging tool actually used for Wide Body (WB), Single Aisle (SA) and Long Range (LR) aircrafts. This mechanical type tool is formed by an elongated guide (16) to be positioned on the THS extrados skin, and a gauge (17) intended to be placed under one extreme of the guide (16) to measure the deviation between their extremes. This mechanic gauge (17) provides measurements with deviations lower than 0.05°.

To provide a measure, the guide (16) is extended from the THS extrados skin up to the elevator. For that, the size of this type of guides goes from 2 to 3 meters long, which complicates its handling.

Further, it is necessary to have guides of various sizes to cover different types of aircrafts.

Figure 2:
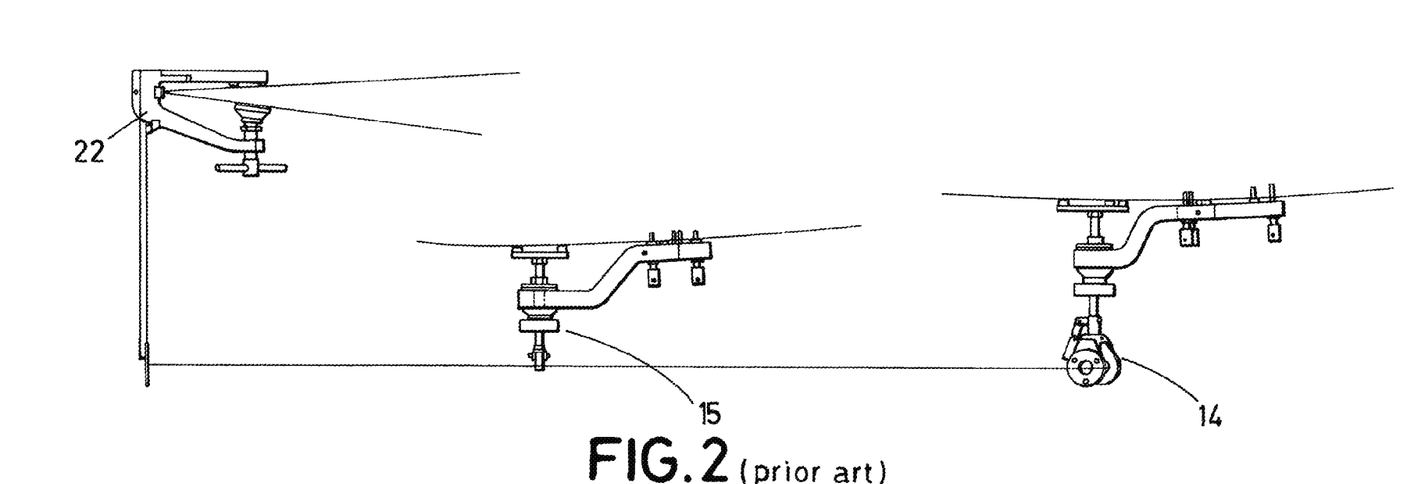
FIG. 2 shows an optical rigging tool of the state of the art.

FIG. 2 shows another rigging tool actually used for Long Range (LR) aircrafts. This optical type tool is formed by a theodolite (14), a target sight platform (15) and a target plate (22). The showed tool is intended to be positioned on intrados skin, such that the elevator is set in a neutral position when the three components are in line.

This tool is expensive, delicate and very difficult to assemble. Also, although a theoretical accuracy of 0.001° can be reached, the real accuracy usually reached is close to 0.5°, due to its extreme complex design, and the difficult to reach drawing tolerances when the tool is being assembled by the manufacturer.

It would therefore be desirable to provide technical approach(es) that offer a common solution for setting a neutral position on any control surface of an aircraft, while providing good accuracy, and simplifying its use and manufacture.

SUMMARY

The present disclosure overcomes the above mentioned drawbacks by providing a rigging tool for a control surface of an aircraft having a compact and versatile design, and being adapted to be used on any trimmable surface.

An object of the present disclosure is to provide an accurate rigging tool capable of minimizing measurement deviations of current tools, offering deviations lower than 0.05°. It is a further object of the disclosure herein to provide this deviation value without complex or delicate adjustments.

Another object of the disclosure herein is to provide a versatile tool, adapted to be used in any trimmable surface of an aircraft.

Further, it is an object of the disclosure herein to provide a compact and lighter tool, easier to use, and easier and cheaper to manufacture than the tools actually in service.

The present disclosure refers to a rigging tool for a control surface of an aircraft comprising a laser, a target assembly, and a laser platform.

The laser is configured for outputting a low energy laser beam.

The target assembly comprises a plate and a support to sustain the target assembly on a surface of a control surface. The plate includes a target point to indicate the neutral position of the horizontal stabilizer elevator.

The laser platform is shaped as an elongated body provided with structure to rest on a surface of a control surface. This laser platform body has backward and forward extremes. The backward extreme is configured to hold the laser. The forward extreme comprises a pair of holes provided at opposite positions aligned with the output of the laser.

The incidence of a laser beam onto the target point upon passing through the pair of holes of the forward extreme of the laser platform indicates that a neutral position is set on the control surface.

With this configuration, the disclosure herein provides a versatile tool, adapted or configured to be easily used on any control surface, by the positioning of the laser platform at one side of the control surface and the target assembly at the opposite side of control surface. This way, the disclosure herein provides a tool that can be used on neutral position setting tasks of different aircrafts, since its design is not related with the size of the trimmable surface.

In addition, the tool offers a simple design, and requires fewer pieces than conventional tools, such as known optical tools, which involves an easier manufacturing, assembly, and use, and a considerable cost saving.

With the tool of the disclosure herein, deviations lower than 0.05° can be reached. Further, due to the special design of the laser platform, the laser beam can be easily adjusted to keep the desired accuracy by just doing that the laser beam passes through the pair of holes provided at opposite sides of the forward extreme of the laser platform. This way, the disclosure herein provides full accuracy without complex or delicate adjustments.

Further, due to this special design of the laser platform, the tool simplifies the calibration of the laser on each use, avoiding the need for specific calibrations.

Additionally, since the tool comprises a laser adapted for outputting a low energy laser beam, operators no longer need extra protection, such as polarized glasses for protecting eyes.

BRIEF DESCRIPTION OF THE DRAWINGS

For a better comprehension of the disclosure herein, the following drawings are provided for illustrative and non-limiting purposes, wherein.

DETAILED DESCRIPTION

Figure 3:
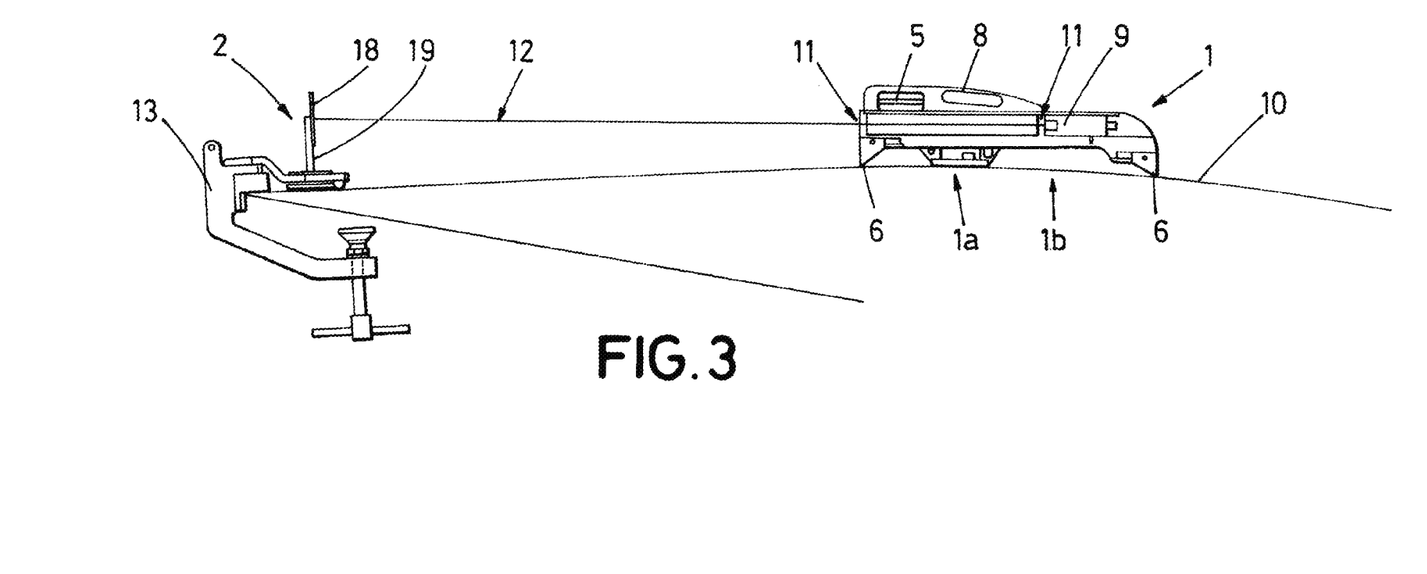
FIG. 3 shows a lateral view of the rigging tool of the disclosure herein, positioned on a control surface of an aircraft, according to a preferred embodiment of the disclosure herein.
Figure 4:
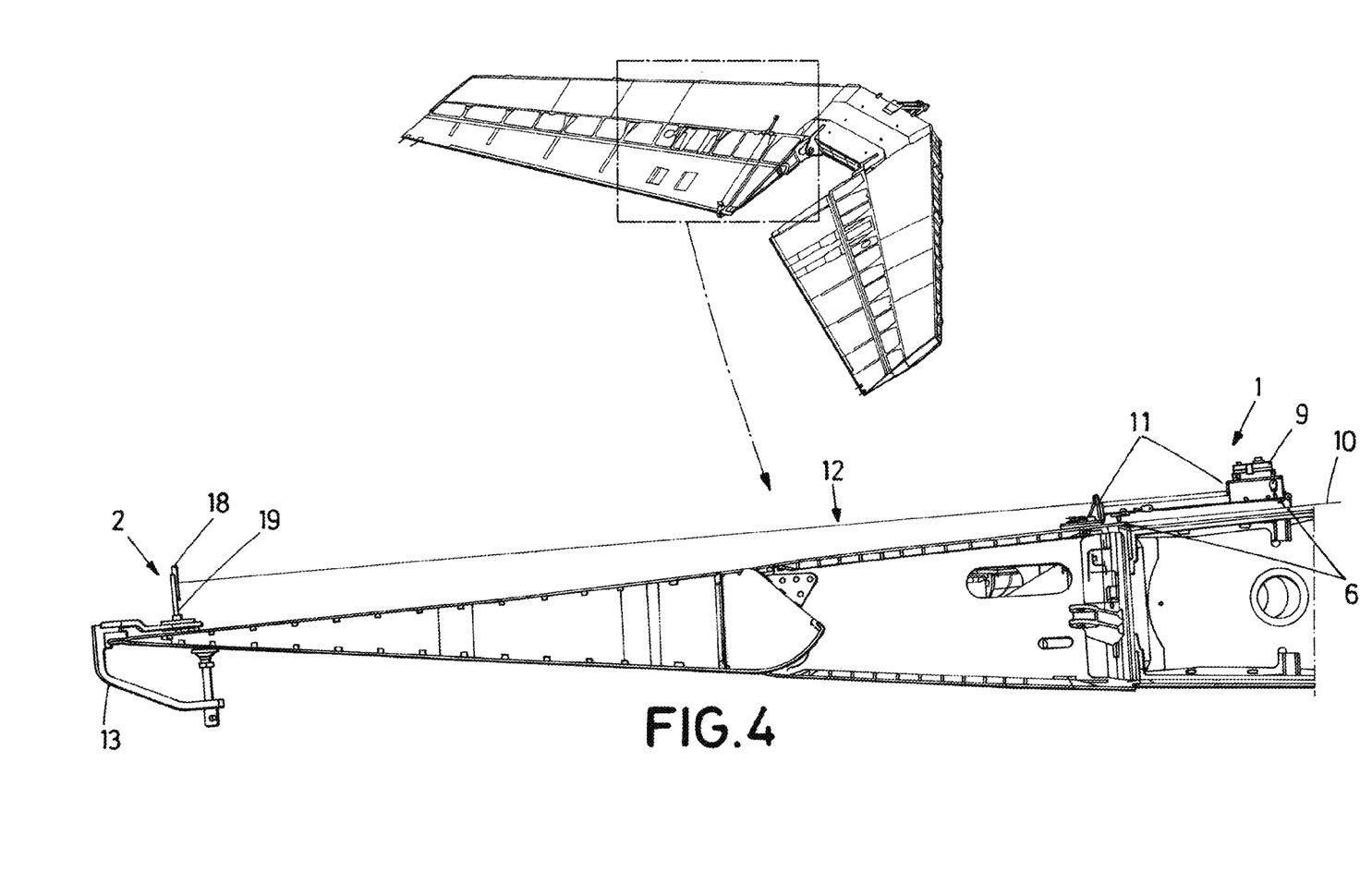
FIG. 4 shows a lateral view of the rigging tool of the disclosure herein, positioned on a control surface of an aircraft, according to a preferred embodiment of the disclosure herein.
Figure 6:
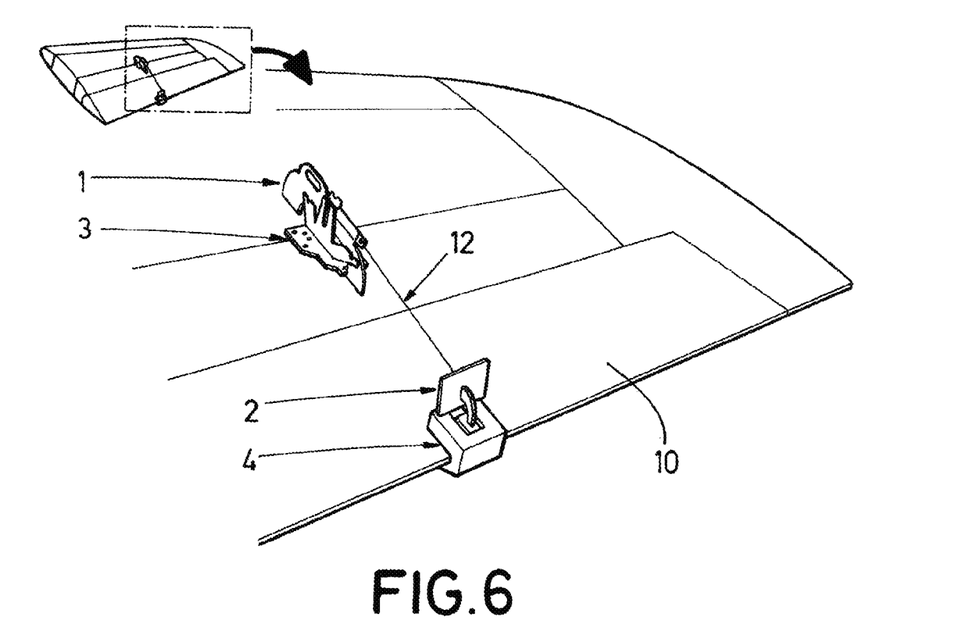
FIG. 6 shows a perspective view of the rigging tool of the disclosure herein, positioned on a control surface of an aircraft, according to another embodiment of the disclosure herein.

FIGS. 3, 4 and 6 show a rigging tool for a control surface (10) of an aircraft.

The rigging tool comprises a laser (9) for outputting a low energy laser beam (12), a laser platform (1) configured for holding the laser (9), and a target assembly (2) including a target point (24) to indicate that a neutral position of a control surface (10) is set.

The laser platform (1) is shaped as an elongated body comprising backward (1b) and forward extremes (1a).

The backward extreme (1b) is configured to hold the laser (9), while the forward extreme (1a) comprises a pair of holes (11) provided at opposite positions of the forward extreme (1a), in alignment with the output of the laser (9). This pair of holes (11) provides a simpler laser calibration. This way, the laser (9) can be easily adjusted on each use, avoiding specific calibrations.

According to a preferred embodiment, the pair of holes (11) are separated a length of at least 30 cm. With this configuration, the tool minimizes angulation errors, offering full precision results on distances up to 5 meters, provided the laser beam (12) passes through the pair of holes (11).

As shown in FIGS. 3, 4 and 6, both the target assembly (2) and the laser platform (1) are provided with structure to rest on the control surface (10) to perform the measurements.

For that, the target assembly (2) comprises a support (19) to sustain the target assembly (2) on a surface of a control surface (10), and a plate (18) coupled to the support (19) and including the target point (24).

As shown in FIGS. 3 and 4, according to a preferred embodiment, each extreme (1a, 1b) of the laser platform (1) has at least one metallic foot (6) to rest on a control surface (10). This way, the tool provides a more accurate measurement than other conventional tools, since conventional points of contact between the tools and the aircraft surfaces are based on nylon, which as being a deformable material is not able to offer a precise positioning of the tool. Further, since the material of the skin of the aircraft is harder than the material of the foot (6) of the laser platform (1), this foot (6) provides a suitable point of contact.

Figure 7:
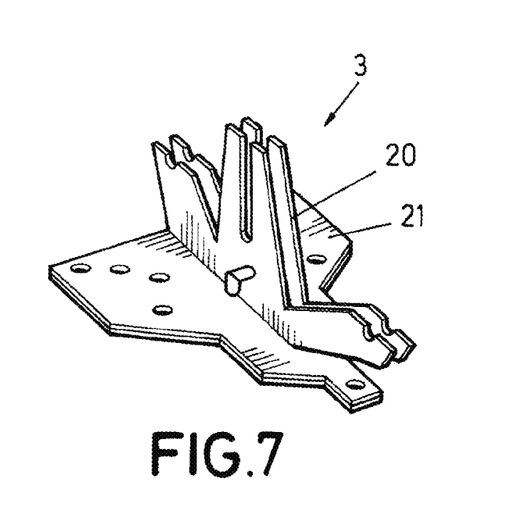
FIG. 7 shows a laser support to receive and hold the laser platform in an upright position, according to another preferred embodiment of the disclosure herein.

Alternatively, as shown in FIGS. 6 and 7, according to another preferred embodiment, the tool may further comprise a laser support (3) formed by a flat base (21) attached to a double vertical wall (20). The flat base (21) is configured to rest on a surface of a control surface (10). The double vertical wall (20) is configured to receive the laser platform (1) and hold it in an upright position on the surface of the control surface (10).

According to another preferred embodiment, the backward extreme (1b) of the laser platform (1) comprises structure to vary the position of the laser (9) in the three dimensions of space. This way, the laser (9) is easy to manage.

According to another preferred embodiment, the forward extreme (1a) of the laser platform (1) comprises a battery (5) to feed the laser (9). This configuration improves the stability of the laser platform (1) on a surface, since the battery (5) compensates the weight of the laser (9).

According to another preferred embodiment, the target assembly (2) is a single body (made of one piece), and the support (19) comprises at least one foot (23) to contact and rest on a surface of a control surface (10). This way, the tool achieves better accuracy in the measurements, since it directly contacts with the surface of the control surface (10).

According to another preferred embodiment, the target assembly (2) comprises attaching structure coupled to the support (19) to fix the target assembly (2) to a surface of a control surface (10).

Figure 5A:
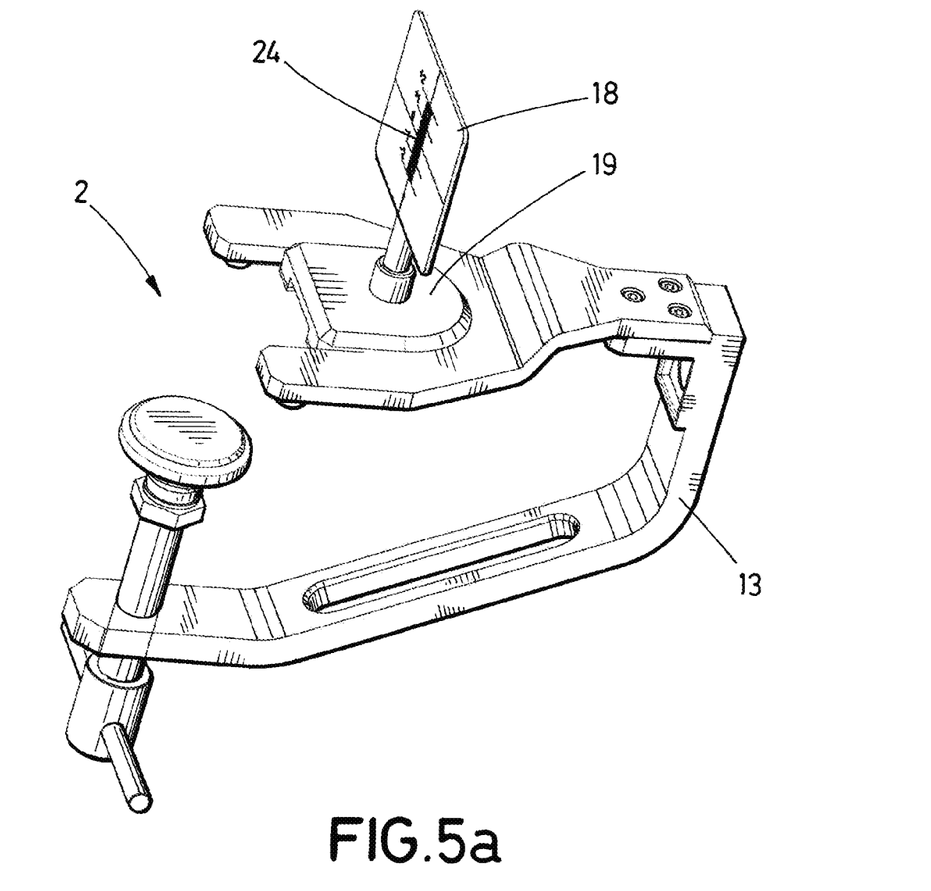
FIG. 5a-5b show detailed views of the target assembly shown in FIG. 4, drawing (A) shows a perspective view and drawing (B) a lateral view.
Figure 5B:
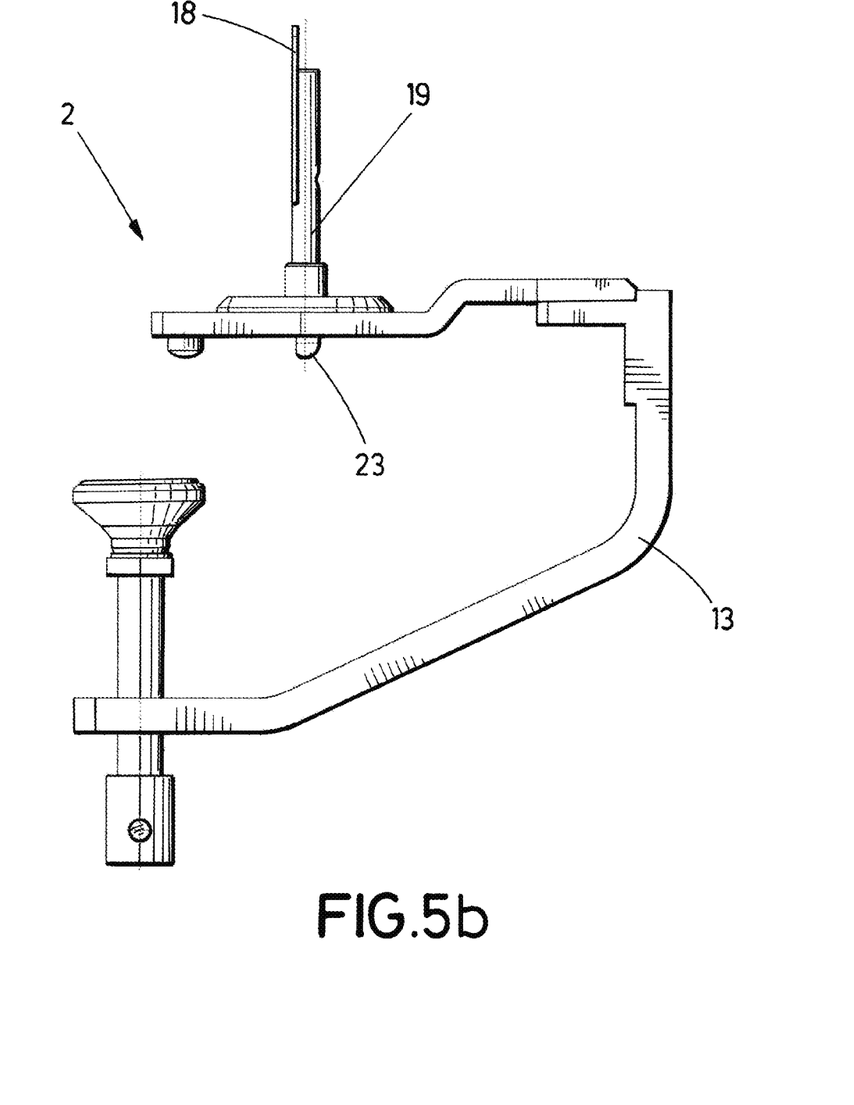

FIGS. 3, 4 and 5 show a preferred embodiment of the attaching structure, which comprises a clamp (13) to provide an adjustable fixing.

Figure 8:
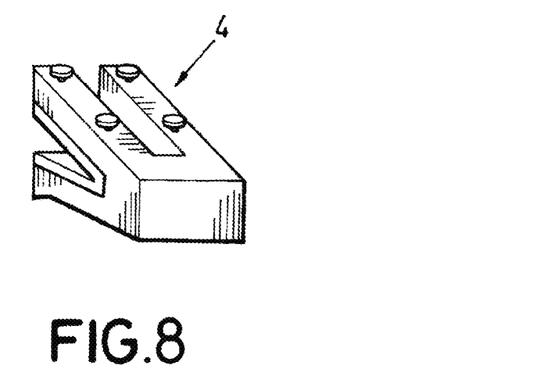
FIG. 8 shows the attaching structure of the support of the target assembly, to fix the target assembly to a surface of a control surface, according to another preferred embodiment of the disclosure herein.
Figure 9:
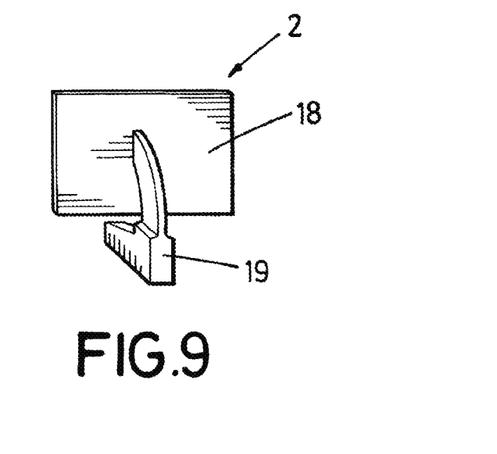
FIG. 9 shows a schematic perspective view of the target assembly shown in FIG. 6.

FIGS. 6 and 8 shows an alternative preferred embodiment of the attaching structure, including a V-shaped piece (4) configured to receive the edge of the control surface (10).

In both cases, the attaching structure fixes the target assembly (2) without needing to be riveted.

Finally, it should be noted that the target assembly (2) and the laser platform (1) may be positioned to be used on the extrados and on the intrados of a control surface, without requiring further adaptations.

While at least one exemplary embodiment of the present disclosure herein(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims.

The invention claimed is:

1. A rigging tool for a control surface of an aircraft comprising:
   a laser for outputting a low energy laser beam;
   a target assembly comprising a plate including a target point, and a support to sustain the target assembly on a surface of a control surface; and
   a laser platform shaped as an elongated body provided with structure to rest on a surface of a control surface, the laser platform having backward and forward extremes;
   the forward extreme comprising a first hole fixed at a forward position of the forward extreme and a second hole fixed at a rear position of the forward extreme; and
   the backward extreme being configured to hold the laser in a position in which an output of the laser is aligned with the first hole and the second hole, wherein the backward extreme comprises structure to vary the position of the laser in three dimensions of space; and wherein, in operation, when the laser beam passes through the first hole and the second hole and incises in the target point, a neutral position of a control surface is indicated.

2. A rigging tool for a control surface of an aircraft, according to claim 1, wherein each extreme of the laser platform has at least one metallic foot to rest on a surface of a control surface.

3. A rigging tool for a control surface of an aircraft, according to claim 1, wherein the first hole and the second hole are separated a length of at least 30 cm.

4. A rigging tool for a control surface of an aircraft, according to claim 1, wherein the forward extreme of the laser platform comprises a battery to feed the laser.

5. A rigging tool for a control surface of an aircraft, according to claim 1, wherein the target assembly is a single body, and wherein the support comprises at least one foot to contact and rest on a surface of a control surface.

6. A rigging tool for a control surface of an aircraft, according to claim 1, wherein the target assembly comprises attaching structure coupled to the support to fix the target assembly to a surface of a control surface.

7. A rigging tool for a control surface of an aircraft, according to claim 6, wherein the attaching structure comprises a V-shaped piece.

8. A rigging tool for a control surface of an aircraft, according to claim 1, wherein the attaching structure comprises a clamp to provide an adjustable fixing.

9. A rigging tool for a control surface of an aircraft, according to claim 1, further comprising a laser support formed by a flat base attached to a double vertical wall, the flat base configured to rest on a surface of a control surface, and the double vertical wall configured to receive the laser platform and hold it in an upright position on the surface of the control surface.

* * * * *